(12) United States Patent
Dhalla et al.

(10) Patent No.: US 8,819,440 B2
(45) Date of Patent: Aug. 26, 2014

(54) DIRECTED SIGNATURE WORKFLOW

(75) Inventors: Mahmood A. Dhalla, Sammamish, WA (US); Marcio De Mello, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1147 days.

(21) Appl. No.: 11/222,538

(22) Filed: Sep. 9, 2005

(65) Prior Publication Data

US 2007/0061578 A1    Mar. 15, 2007

(51) Int. Cl.
*H04L 9/32* (2006.01)

(52) U.S. Cl.
CPC ................................. *H04L 9/3281* (2013.01)
USPC ........................................ 713/176; 713/180

(58) Field of Classification Search
None
See application file for complete search history.

(56) References Cited

U.S. PATENT DOCUMENTS

| | | | | |
|---|---|---|---|---|
| 7,353,397 | B1 * | 4/2008 | Herbach | 713/176 |
| 7,716,570 | B2 * | 5/2010 | Adelberg et al. | 715/209 |
| 2003/0144949 | A1 * | 7/2003 | Blanch | 705/38 |
| 2004/0230891 | A1 * | 11/2004 | Pravetz et al. | 715/511 |
| 2006/0048127 | A1 * | 3/2006 | Smith et al. | 717/162 |
| 2006/0212707 | A1 * | 9/2006 | Cahill et al. | 713/176 |

FOREIGN PATENT DOCUMENTS

| | | |
|---|---|---|
| CN | 1529859 A | 9/2004 |
| EP | 1455479 | 9/2004 |
| EP | 1524580 | 4/2005 |
| JP | 2297156 | 12/1990 |
| JP | 6224896 | 8/1994 |
| JP | 10084341 | 3/1998 |
| JP | 2002139997 | 5/2002 |
| JP | 2004260664 | 9/2004 |
| JP | 2004531918 A | 10/2004 |
| WO | WO0199388 | 12/2001 |
| WO | WO02059728 | 8/2002 |

OTHER PUBLICATIONS

Product Description for StampPDF Batch 3.2 Sep. 4, 2004.*
Foreign Search Report dated Jan. 24, 2007, relating to Application No. PCT/US2006/034639.
Translated the Chinese Office Action mailed Mar. 23, 2011 for Chinese Patent Application No. 200910207974.6, a counterpart foreign application of U.S. Appl. No. 11/222,538, 8 pages.
Translated the Japanese Office Action mailed Jun. 14, 2012 for Japanese patent application No. 2008-530150, a counterpart foreign application of U.S. Appl. No. 11/222,538, 3 pages.
The Extended European Search Report mailed Aug. 6, 2012 for European patent application No. 06803010.5, 6 pages.
Translated the Japanese Office Action mailed Jan. 6, 2012 for Japanese patent application No. 2008-530150, a counterpart foreign application of U.S. Appl. No. 11/222,538, 9 pages.

(Continued)

*Primary Examiner* — Kaveh Abrishamkar
(74) *Attorney, Agent, or Firm* — John Jardine; Andrew Sanders; Micky Minhas

(57) ABSTRACT

Techniques relating to directed signature workflow of a document are described. In one instance, a process enables a publishing user to populate a body portion of a document with content. The process also allows the publishing user to populate an associated digital signature definitions portion of the document with at least one requested consuming user's name and at least one condition associated with a digital signature of the requested consuming user.

20 Claims, 9 Drawing Sheets

(56) References Cited

OTHER PUBLICATIONS

Kanazawa, "Replacing System Using Papers", Network Magazine, May 2005, vol. 10, No. 5, pp. 68-71.
Translated the Korean Office Action mailed Feb. 19, 2013 for Korean patent application No. 10-2008-7005748, counterpart foreign application of U.S. Appl. No. 11/222,538, 6 pages.
Translated the Japanese Office Action mailed Sep. 30, 2013 for Japanese patent application No. 2012-225886, a counterpart foreign application of U.S. Appl. No. 11/222,538, 8 pages.
Yamada, et al., "Construction and Operation of Secure Paperless Service (SPS)", Technical Report of the Proceeding of the The Institute of Electronics, Information and Communication Engineers, vol. 97, No. 66, May 1997, pp. 25-30.

* cited by examiner

|  118 |  |
|---|---|
| INTENDED CONSUMING USER 202 | DEFINITION(S) 204 |

FIG. 2

|  118 |  |
|---|---|
| JOHN DOE 202 | I AGREE TO ALL TERMS AND CONDITIONS OF THIS DOCUMENT 204 |

FIRST SIGNATURE DEFINITION SET 602

| FIRST DEFINITION 612 | JIM.BROWN@ABCD.COM |
| SECOND DEFINITION 614 | I AM THE AUTHOR OF THIS DOCUMENT |
| THIRD DEFINITION 616 | |

SECOND SIGNATURE DEFINITION SET 604

| FIRST DEFINITION 622 | IMAGINARY CORP EXECUTIVE OFFICER |
| SECOND DEFINITION 624 | I AGREE TO ALL TERMS AND CONDITIONS OF THIS ENTIRE DOCUMENT |
| THIRD DEFINITION 626 | DISPLAY DIGITAL SIGNATURE DEFINITIONS PORTION FOLLOWING CONTENT OF LAST PAGE OF THE BODY OF THE DOCUMENT |

IMAGINARY CORP EXECUTIVE OFFICER 622

CLICK HERE TO DIGITALLY SIGN THIS DOCUMENT 402A

I AGREE TO ALL TERMS AND CONDITIONS OF THIS ENTIRE DOCUMENT 624

PAGE TWO 804

CLICK HERE TO DIGITALLY SIGN THIS DOCUMENT

I AGREE TO ALL TERMS AND CONDITIONS OF THIS DOCUMENT 812

JOHN DOE

808

PAGE ONE 802

CLICK HERE TO DIGITALLY SIGN THIS SIGNATURE BOX

I VERIFY THE ACCURACY OF THE INFORMATION ON PAGE ONE OF THIS DOCUMENT 810

JOHN DOE

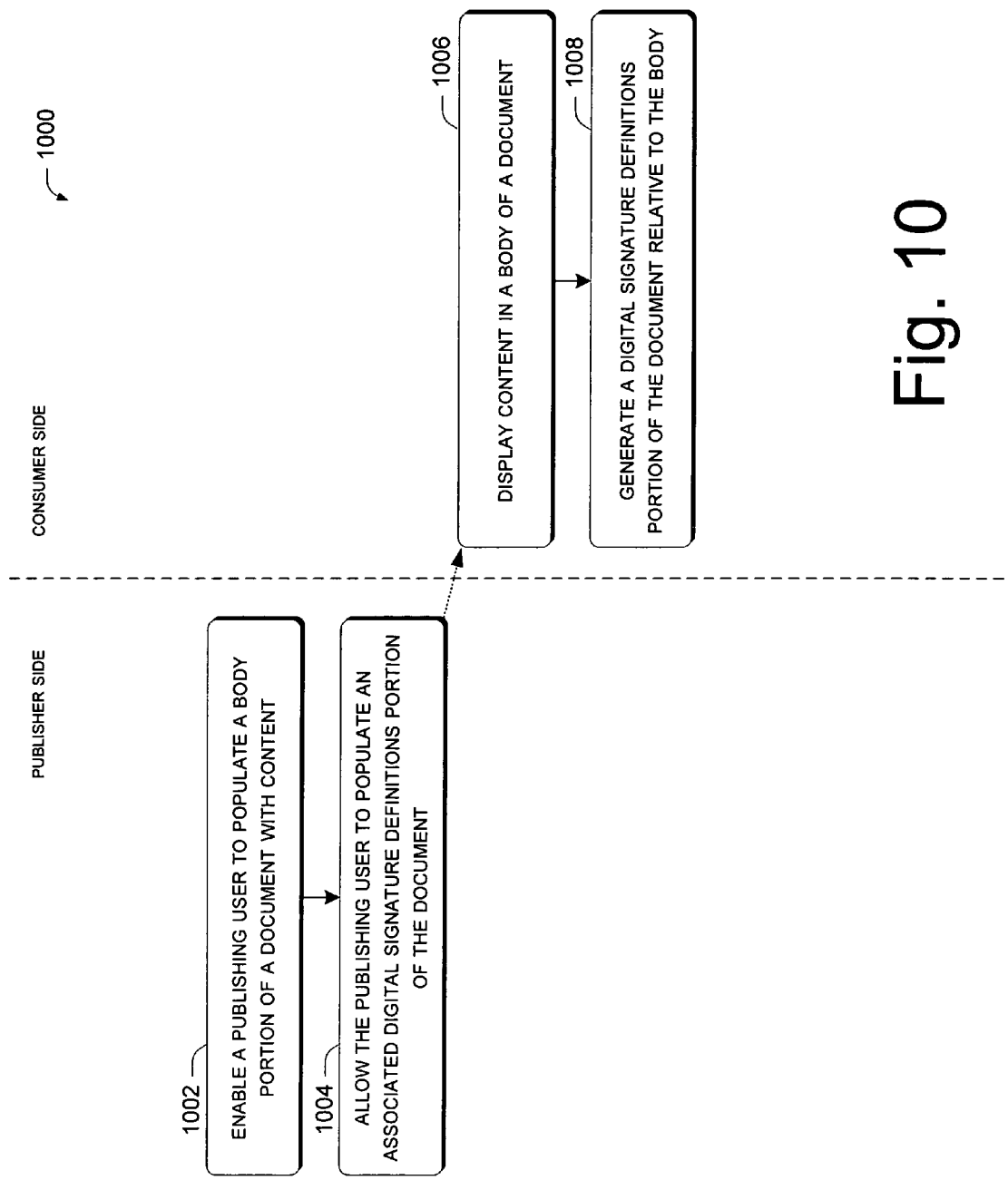

DIRECTED SIGNATURE WORKFLOW

BACKGROUND

Adoption of paperless technologies has been hampered by many users' reluctance to utilize digital signatures to sign documents. Many of these users perceive a lack of control over document workflow in a digital signature scenario and/or potential confusion as to what is actually signed with the digital signature. As a result digital documents are often printed and then signed in a customary pen and ink manner. At that point, whether the document is scanned or handled as a hardcopy, many of the potential advantages are lost.

SUMMARY

Techniques relating to directed signature workflow of a document are described. In one instance a digital signature definitions component provides a mechanism for a publishing user to define a requested set of people to digitally sign a document and the conditions or definitions associated with each requested digital signature. In another instance, a process enables a publishing user to populate a body portion of a document with content. The process also allows the publishing user to populate an associated digital signature definitions portion of the document with at least one requested consuming user's name and at least one condition associated with a digital signature of the requested consuming user.

This Summary is provided to introduce a selection of concepts in a simplified form that are further described below in the Detailed Description.

BRIEF DESCRIPTION OF THE DRAWINGS

FIGS. 2-8 illustrate exemplary documents configured to facilitate directed signature workflow in accordance with one implementation.

FIG. 10 illustrates an exemplary process diagram relating to directed signature workflow in accordance with one implementation.

DETAILED DESCRIPTION

Overview

Figure 1:
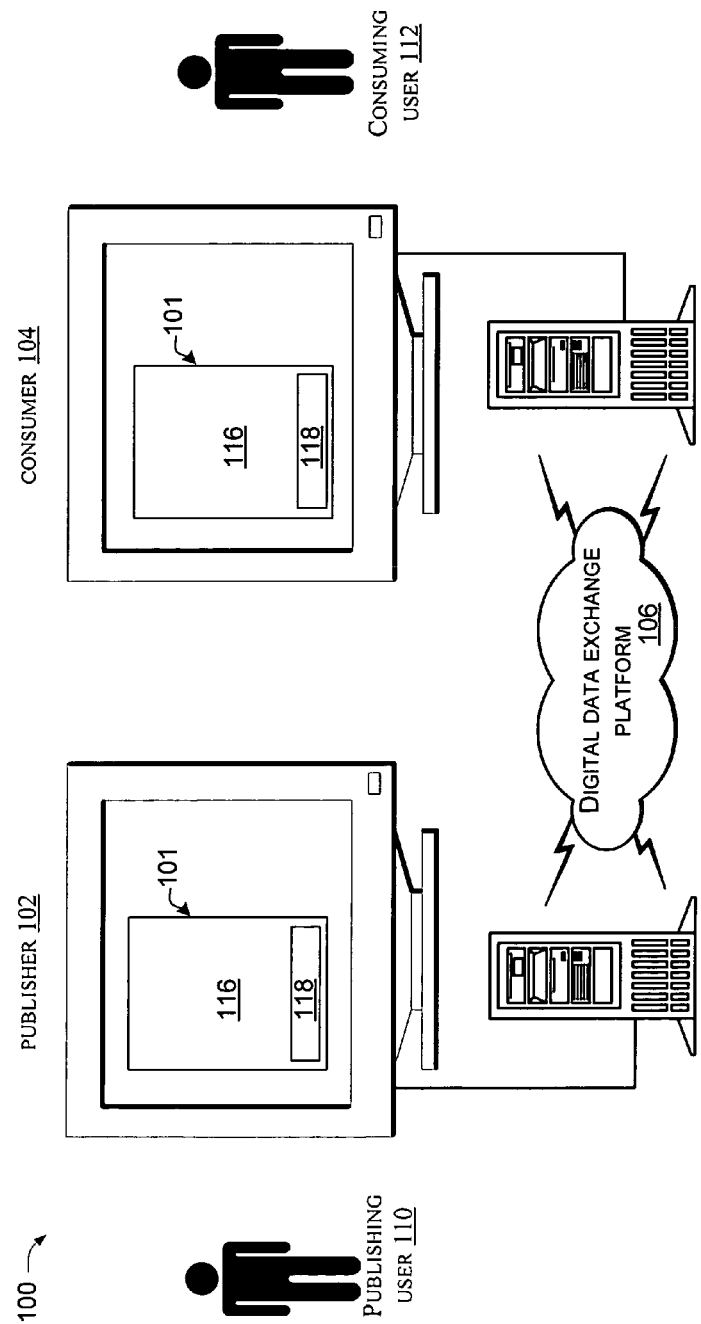
FIG. 1 illustrates an exemplary system for directing signature workflow of a document in accordance with one implementation.

Techniques relating to directed signature workflow of a document are described. A digital signature definitions functionality allows a publishing user to define a requested set of people to digitally sign a document and the conditions or definitions associated with each requested digital signature. In one scenario the techniques provide a digital signature definitions mechanism for a publishing user to supply definitions which guide the signature workflow of an associated document. The signature definitions mechanism serves to provide a document history or documentation trail in a digital signature context which may be similar to, or superior to, a document trail provided in a pen and ink scenario. Such a configuration increases efficiency and decreases the likelihood of misunderstandings arising about what was digitally signed.

In at least some implementations, the digital signature definitions mechanism allows a publishing user of a document to define one or more conditions or definitions which guide the digital signature workflow of the document. In one example, the publishing user can designate, as one of the definitions, a requested consuming user to digitally sign the document. The publishing user can define additional definitions such as an intent associated with the requested consuming user's signature. For instance, such definitions can include a sign by date, and a signing location, among others as will be described in more detail below by way of example.

Exemplary Systems

FIGS. 1-5 collectively show an exemplary system 100 for enabling directed digital signature workflow of an electronic document 101. System 100 includes a publisher 102 coupled to a consumer 104 via a digital data exchange platform 106. The digital data exchange platform can include any means for transferring the digital data. For instance, in one example various types of networks can be utilized to transfer the electronic document 101. In another example, the electronic document can be stored on some type of storage media, such as a disk or a flash device, and physically handed from one person to another.

In this instance, publisher 102 includes programs or software operating on a physical computing device to create a user-interface for a publishing user 110. Similarly, consumer 104 includes programs or software operating on a physical computing device to create a user-interface for a consuming user 112.

Publisher 102 provides a digital signature definitions mechanism (not specifically designated) which can be utilized by the publishing user during the document composition process if so desired. In this instance, the digital signature definitions mechanism is manifested as a digital signature definitions component as will be described in more detail below. The digital signature definitions mechanism allows the publishing user to direct the digital signing work flow of the document by pre-defining digital signature information about the document. The digital signature information is evidenced when consumer 104 subsequently obtains and displays document 101 for consuming user 112. Such an example is more thoroughly illustrated in examples described in relation to FIGS. 2-5.

In this instance, document 101 contains a body portion 116 and an associated signature spot or digital signature definitions portion(s) 118. In this implementation, the digital signature definitions portion is derived from data maintained as a separate and distinct component of the document and hereinafter referred to as a digital signature definitions component. The digital signature definitions component is populated with definitions provided by the publishing user as will be described below.

The digital signature definitions component functions as a central location of data relating to digital signature definitions defining the digital signature workflow of the document. Stated another way, the digital signature definitions component provides a mechanism for a publishing user to define a requested set of people to digitally sign the document and the conditions or definitions associated with each requested digital signature. The digital signature definitions portion 118 can be generated, at least in part, from the data of the digital signature definitions component. In this instance, the digital signature definitions component is manifested as metadata associated with the body portion 116.

FIG. 2 illustrates an example of how the digital signature definitions portion 118 may be presented to the publishing user 110 during document composition. The digital signature definitions portion 118 allows the publishing user to specify an intended consuming user field 202 in which the publishing user can request that a specified consuming user digitally sign the document. The digital signature definitions portion further allows the publishing user to define one or more conditions or definitions in a definitions field 204 associated with the intended consuming user field 202. The definitions field may be populated with a variety of definitions such as, but not limited to, what predefined intent is associated with the consuming user's digital signature and/or a deadline by which the intended consuming user is requested to sign. Still other examples of definitions can include, but are not limited to, signing location (for jurisdictional purposes), types of digital signature certifications which are accepted, and whether a time stamp corresponding the consuming user's digital signature is requested. Examples of these and other definitions will be described in more detail below.

FIG. 3 illustrates a hypothetical example of how digital signature definitions portion 118 appears upon completion by the publishing user 110. In this instance the intended consuming user field 202 is populated with the name 'John Doe' and the definitions field 204 is populated with the definition "I agree to all terms and conditions of this document".

Figure 4:
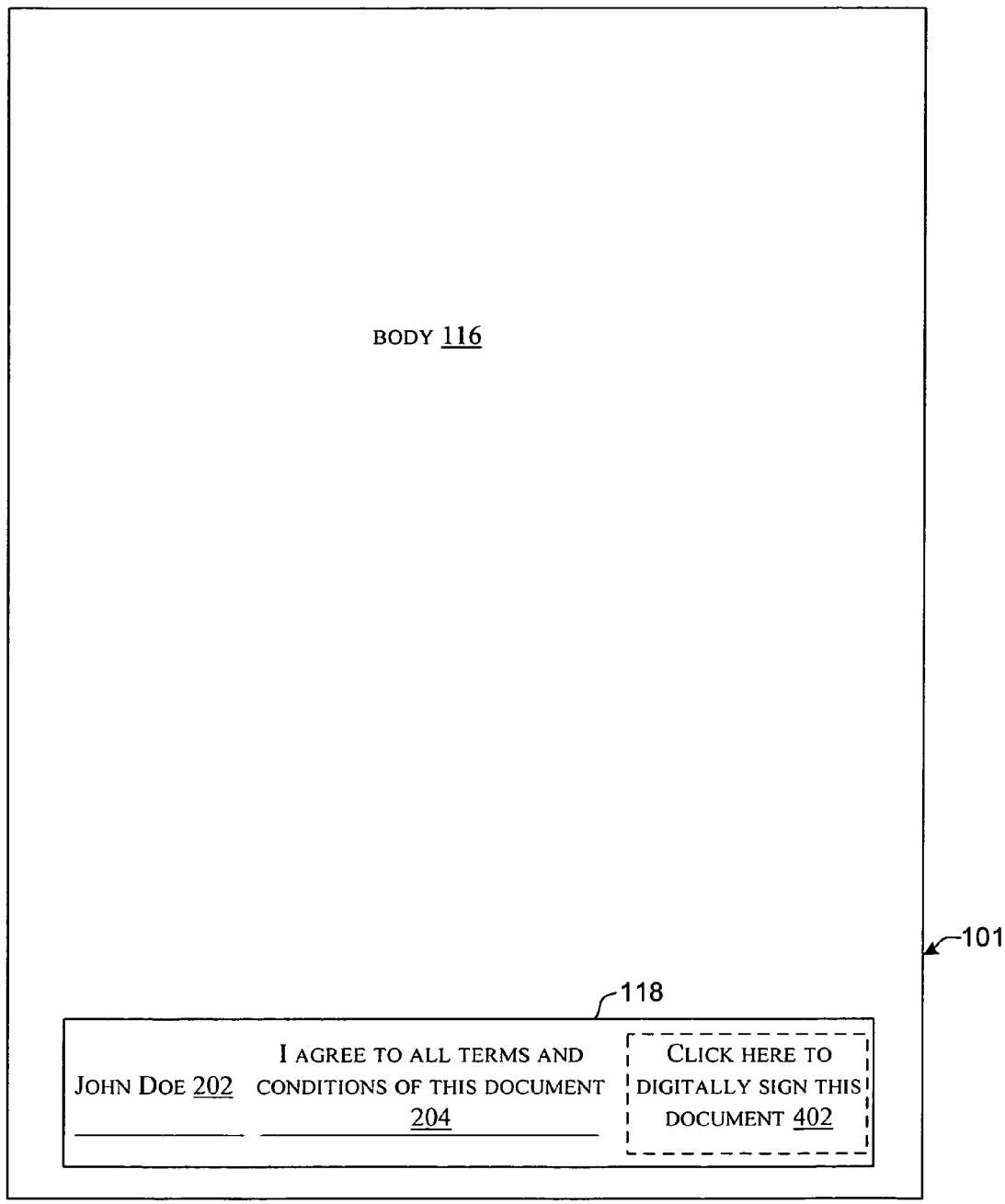

FIG. 4 illustrates a hypothetical example of how document 101 appears subsequently for the consuming user 112 when the document is opened and parsed by consumer 104. The consuming user can see the body portion 116 of the document 101 as well as the digital signature definitions portion 118. Other implementations may allow users to view the digital signature definitions portion 118 independently from the body portion 116. In at least some implementations, the digital signature definitions portion 118 is superimposed over the body portion 116 in a manner which does not block visibility of content of the body portion. Other implementations may block some or all of the body portion when displaying the digital signature definitions portion.

In this instance, the consuming user can see the intended consuming user field 202 is populated with the name 'John Doe' and the definitions field 204 is populated with the definition "I agree to all terms and conditions of this document". Further, the consuming user can digitally sign the document by clicking an interface box 402 which states 'Click here to digitally sign this document'. When the user clicks the interface box the system goes through one or more steps to facilitate digitally signing the document. For example, among other configurations, the system may allow the user who is signing the document to pick a certificate to sign with. The system may also allow the user to choose whether to embed this certificate in the document, and it may allow the user to pick restrictions to place on the document upon signing. The described configuration allows the consuming user to see the content of the body portion 116 as well as the signature definitions portion 118 when signing the document. For example, in this instance the consuming user can see some or all of the body portion 116 and the digital signature definitions portion 118 when clicking the interface box 402 to initiate the digital signature process. Further still, the described implementation can effectively create a snap-shot of what the consuming user saw on the screen if and when they clicked the interface box 402.

In this instance, the interface box 402 enables the consuming user's digital signature and is positioned in the digital signature definitions portion 118 with the definition associated with the consuming user's digital signature. Such a configuration, promotes the consuming user's knowing the definitions(s) associated with his or her signature, or stated another way, to know and agree to the intent associated with their signature. In this particular scenario, the consuming user is not intended to be able to change the contents of the intended consuming user field 202 and definitions field 204. If the consuming user does not agree with the conditions, the consuming user simply does not sign the document.

Figure 5:
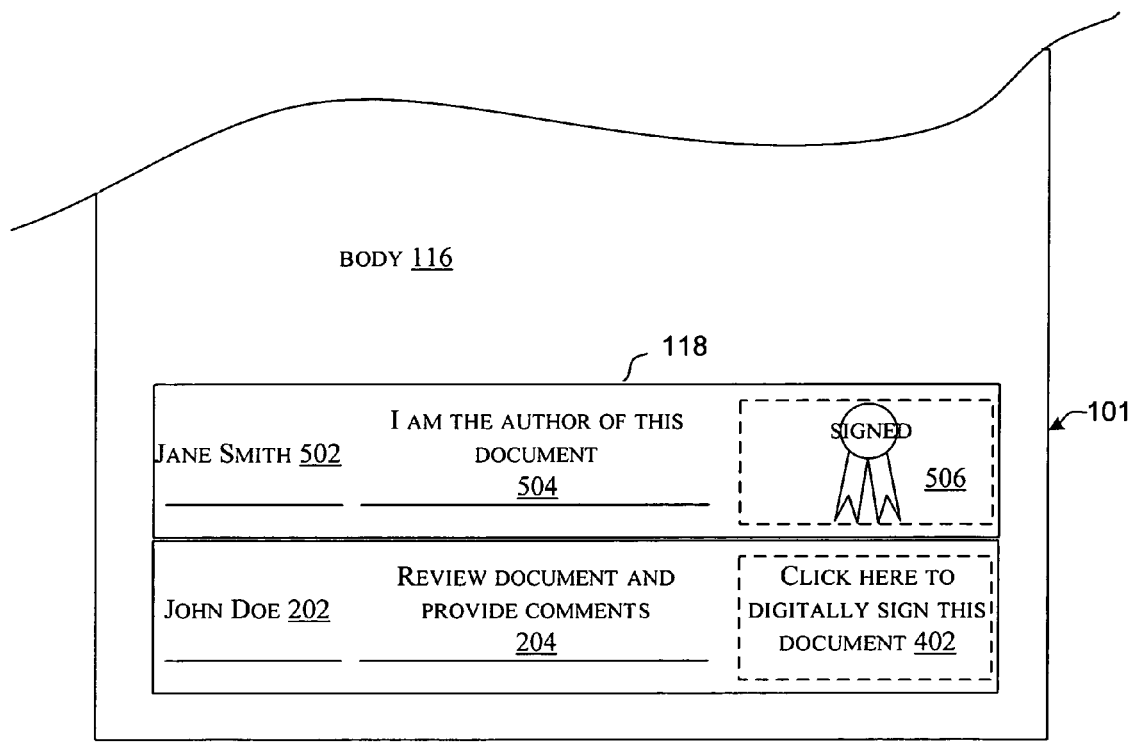

FIG. 5 provides an alternative manifestation of document 101 where the digital signature definitions portion 118 provides a visible digital signature workflow history of the document. In this instance the consuming user with hypothetical name John Doe is evidenced at 202. The author's name (hypothetical Jane Smith) and associated definition at 502 and 504 respectively are also displayed. Further, the consuming user can see that the author digitally signed the document as evidenced at 506. The consuming user can see the definition 204 established by the author (publishing user) for the consuming user and how to digitally sign the document as indicated at 402 if the consuming user agrees to the pre-established definitions such as indicated at 204.

At least some implementations provide the publishing user with an additional degree of control over the digital signature workflow. For instance, the publishing user can determine whether the consuming user is to be able to change the conditions associated with their own (consuming user's) digital signature. For example, in one scenario the publishing user may not want the consuming user to be able to change the conditions. In such a scenario the publishing user defines the conditions for the consuming user such as condition 204. The publishing user then digitally signs the digital signature definitions portion 118 such as is indicated at 506 in FIG. 5. This configuration prevents the consuming user from subsequently changing condition 204 without breaking the publishing user's digital signature 506. Accordingly, the presence of the publishing user's valid digital signature as well as a subsequently added consuming user's digital signature stands as evidence that the document was signed by the consuming user in accordance with the signature conditions defined by the publishing user. In contrast, if the consuming user changed the conditions, the publishing user's digital signature would be invalidated.

In an alternative scenario where the publishing user wants to allow the consuming user to be able to change the conditions such as condition 204 then the publishing user leaves the digital signature definitions portion unsigned. The consuming user can then change the conditions and digitally sign the document.

In the example described in relation to FIGS. 1-5, document 101 can be in any format which satisfies the desires of a particular publishing user and to which metadata can be associated. For instance, the user may want to be able to add one or more of text, graphics, spreadsheets, images etc. to compose the body of the document. Examples of applications which can be utilized include, but are not limited to applications directed to a specific functionality such as word processing applications, or spreadsheet applications. Other examples of applications include more generic applications, including for example, a page description language based format such as portable document format (PDF). Another example includes Extensible Markup Language (XML) document types. One example of such a document type is the XML Paper Specification (XPS) document format, developed by Microsoft Corporation of Redmond Wash.

FIGS. 6-7 provide another example of an implementation for directing a document's digital signature workflow. FIG. 6 illustrates portions of a user-interface provided for the document's publishing user while FIG. 7 illustrates portions of the user-interface provided for the consuming user. For purposes of explanation, only a document's digital signature definitions portion is illustrated; examples illustrating both the digital signature definitions portion and the body portion are illustrated above in relation to FIGS. 1, and 4-5.

In the discussion above in relation to FIGS. 2-5, for purposes of explanation, the publishing user provides a user name, such as his own or that of an intended consuming user, and then defines one or more definitions for each user name. However, described another way, the user names can simply be considered as one of the definitions which the publishing user supplies. For purposes of explanation consider FIGS. 6-7.

FIG. 6 illustrates an example of how a digital signature definitions portion may be presented to the publishing user. In relation to digital signature definitions portion 118A, the publishing user can define a set of one or more definitions. In this instance, a first signature definition set 602 and a second signature definition set 604 are illustrated. At least some implementations allow the publishing user to designate as many signature definition sets as desired. Under each signature definition set heading the publishing user can supply one or more definitions in provided definition fields. For instance, as illustrated in relation to first signature definition set 602, the publishing user is supplied with an opportunity to add definitions to three definition fields, indicated as first definition field 612, second definition field 614, and third definition field 616. While only three definition fields are illustrated here, at least some implementations can allow the publishing user to supply as many definitions in relation to a particular signature definition set as desired. Some implementations may limit the publishing user to defining certain pre-established definitions which for example may be provided via a drop-down menu. Other implementations may allow the publishing user to define any definitions which the publishing user so desires. Still other implementations may have pre-established definitions for use by the publishing user and may also allow the publishing user to supply his/her own definitions as desired.

In relation to first signature definition set 602, the publishing user populated the first definition field 612 with a hypothetical name in the form of an email address "Jim.Brown@ABCD.com". At least in some implementations the publishing user can utilize any name for himself/herself and/or the intended consuming user's that he/she desires to digitally sign the document. For instance, the publishing user may designate an intended consuming user as a proper given name, as an email address, as an ID number or any other means for specifying the intended consuming user.

In the described example, the publishing user also populated the second definition field 614 with a definition of "I am the author of this document". The publishing user left the third definition field 616 blank.

In relation to second signature definition set 604, the publishing user populated the first definition field 622 with the definition "Imaginary Corp. Executive Officer". The publishing user populated the second definition field 624 with the definition "I agree to all terms and conditions of this entire document" and the third definition field 626 with the definition "Display digital signature definitions portion following content of last page of the body of the document".

Assume that in this particular implementation, the publishing user can then digitally sign the document and as such the digital signature definitions portion such that if the definitions of the digital signature definitions portion are subsequently altered the publishing user's digital signature is invalidated. While the publishing user is listed in the first signature definitions set in this instance, the relative order of the users need not have any significance as will become apparent below.

Assume further that document 101A has been received by the hypothetical "Imaginary Corp. Executive Officer". When document 101A is loaded and opened on an associated computer the digital signature definitions component is parsed. As part of this process, when the computing device examines the definitions for the first signature definitions set it looks to see whether the document contains a digital signature associated with Jim.Brown@ABCD.com and in this instance finds such a digital signature. In some configurations, this functionality is achieved via an identification attribute. The identification attribute serves to link a signature to a specific signature condition. The identification attribute is globally unique such that a digital signature is linked to a specific condition. In a particular configuration any digital signature which is added to the document either links to an existing signature definition or invalidates the original digital signature. Such a configuration prevents the consuming user from adding or changing the conditions defined by the publishing user without breaking the publishing user's digital signature.

In one example of matching user signatures to associated conditions, the system may compare a list of defined users and associated identification numbers to a list of available identification numbers. So for example Jim.Brown@ABCD.com may be associated with an identification number associated with his digital signature. If his identification number is also on the list of available identification numbers, then he has digitally signed the document. In this example, the computer correspondingly treats the first signature definitions set 602 as directed to someone who has already digitally signed the document. The computer continues to second signature definitions set 604 and similarly looks for a digital signature associated with "Imaginary Corp. Executive Officer" and when no matching digital signature is located the computer treats this as a requested signatory.

FIG. 7 provides an example of how digital signature definitions portions may be manifested for the requested signatory designated as "Imaginary Corp. Executive Officer". The computer, following the remaining definitions defined for the second user by the producing user generates a digital signature definitions portion 118A. In this instance, only data associated with the second signature definitions set 604 is displayed for the consuming user. At least in some implementations the consuming user can see other digital signature data such as that associated with first signature definitions set 602. One such example is described in relation to FIG. 5. In another instance, the consuming user may right click on digital signature definitions portion 118A and select for example, "view signature history". The skilled artisan should recognize other implementations.

In this example, the definition of first definition field 622 is displayed next to an interface box 402A which allows the consuming user to digitally sign the document. The definition of the second definition field 624 is also represented for the consuming user. The definition from the third definition field 626 is related to a relative position for displaying the digital signature definitions portion relative to the body portion 116A, and may be termed a 'spot location' and is not displayed, but is evidenced in that the digital signature definitions portion 118A is represented following the content of the last page of the body portion 116A of the document 101A. In this instance, the definitions defined by the producing user in the digital signature definitions portion are expressly presented to the consuming user at the time for digitally signing the document or are represented such as through the relative display position of the digital signature definitions portion 118A. Further, some implementations contain some type of enforcement or verification capabilities to ensure that the person digitally signing the document's digital signature definitions portion is actually the requested consuming user. For instance, the defined consuming user's name may be compared to the login name operating on the computer. Other implementations do not attempt to provide enforcement capabilities and as such unintended persons can digitally sign the document. In such a circumstance, a record of what was displayed for the unintended person at the time of signing is maintained and can be utilized as desired.

For ease of explanation the above examples are described in the context of a digital signature definitions portion which relates to an entire document. However, at least in some implementations, individual digital signature definitions portions can be associated with a specific portion of a document such as a specific page, an entire document, and/or a grouping of documents such as might be encountered in a document package such as a XPS document package. An XPS document package is an example of a document package which allows multiple fixed documents to be associated as a single document package. Digital signature definitions portions can be applied to the document package and/or subparts such as individual fixed documents or sub-parts thereof such as individual pages.

FIG. 8 provides an example of a document 101B containing two digital signature definitions portions. In this instance, document 101B includes a page one indicated as 802 and a page two indicated as 804. Assume for purposes of explanation that the publishing user has defined definitions relating to each of two digital signature definitions portions 806, 808. Assume further that in this instance, the definitions supplied by the publishing user are contained in a single digital signature definitions component of the document. In such a scenario, the publishing user defines a spot ID which is a globally-unique identifier associated with an individual digital signature definitions portion to ensure that definitions and signatures and other condition associated with an individual digital signature definitions portion are not misapplied to other digital signature definitions portions. For purposes of explanation, in this example, the digital signature definitions portion designators 806, 808 respectively will be used as the spot IDs.

The publishing user also can define a location or 'spot location' at which each of the respective signature spots or digital signature definitions portions are intended to appear. The spot location can be referenced to the document's body in any suitable way. For instance, the spot location may be in relation to a line of text. For example the spot location may state "position spot ID xyz centered on the page, after line 243". In another example, the spot location is defined by identifying a specific page and then a location on that page. For example, a 'Page URI' may be utilized to define the page and then 'start x' and 'start y' values defined to established the intra-page coordinates.

Assume that in this example, page one 802 has information that the publishing user would like the consuming user to expressly verify. For instance, page one could recite personal information about the consuming user such as mailing address and social security number, or page one could contain pertinent contractual facets such as a number of widgets to be supplied by a certain date at a certain price. Accordingly, the producing user can specify that the digital signature definitions portion having spot ID 806 be positioned centered on the bottom of page one. The publishing user could similarly position the digital signature definitions portion having spot ID 808 at the end of the last page of the document which in this example is page two indicated as 804. This configuration allows the publishing user to define that the consuming user expressly sign the digital signature definitions portion 806 on page one which recites "I verify the accuracy of the information on page one of this document" as indicated at 810. Similarly, the publishing user can define that the consuming user expressly sign the digital signature definitions portion 808 on page two which specifies "I agree to all terms and condition of this document" as indicated at 812. Such a configuration allows the publishing user to take additional steps to further ensure the publishing user and the consuming user are 'having a meeting of the minds' as to what is being digitally signed and as such agreed to.

A digital signature definitions functionality is described above and below which allows a publishing user to define a requested set of people to digitally sign a document and the conditions or definitions associated with each requested digital signature. One possible implementation of the digital signature definitions functionality is captured by the following schema which recites:

```
<?xml version="1.0" encoding="utf-8"?>
<xsd:schema
    xmlns:xsd="http://schemas.microsoft.com/xps/2005/06/
        signature-definitions">
    <xsd:complexType name="SignatureDefinitionsType">
        <xsd:sequence>
            <xsd:element name="SignatureDefinition"
                type="SignatureDefinitionType" minOccurs="1"
                maxOccurs="unbounded" />
        </xsd:sequence>
    </xsd:complexType>
    <xsd:complexType name="SpotLocationType">
        <xsd:attribute name="PageURI" type="xsd:anyURI"
use="required"/>
        <xsd:attribute name="StartX" type="xsd:double"
use="required"/>
        <xsd:attribute name="StartY" type="xsd:double"
use="required"/>
    </xsd:complexType>
    <xsd:complexType name="SignatureDefinitionType">
        <xsd:sequence>
            <xsd:element name="SpotLocation"
type="SpotLocationType"
                minOccurs="0" />
            <xsd:element name="Intent" type="xsd:string"
minOccurs="0"/>
            <xsd:element name="SignBy" type="xsd:dateTime"
minOccurs="0" />
            <xsd:element name="SigngingLocation"
type="xsd:string"
                minOccurs="0" />
        </xsd:sequence>
        <xsd:attribute name="SpotID" type="xsd:ID" />
        <xsd:attribute name="SignerName" type="xsd:string" />
    </xsd:complexType>
    <xsd:element name="SignatureDefinitions"
        type="SignatureDefinitionsType" />
</xsd:schema>
```

The above described concepts provide a digital signature definitions mechanism for a publishing user to supply definitions which guide the workflow of an associated document. This signature definitions mechanism serves to provide a document history or documentation trail for a digitally signed document which at least in some implementations is similar to, or superior to, a document trail provided in a pen and ink scenario.

Exemplary System Environment

Figure 9:
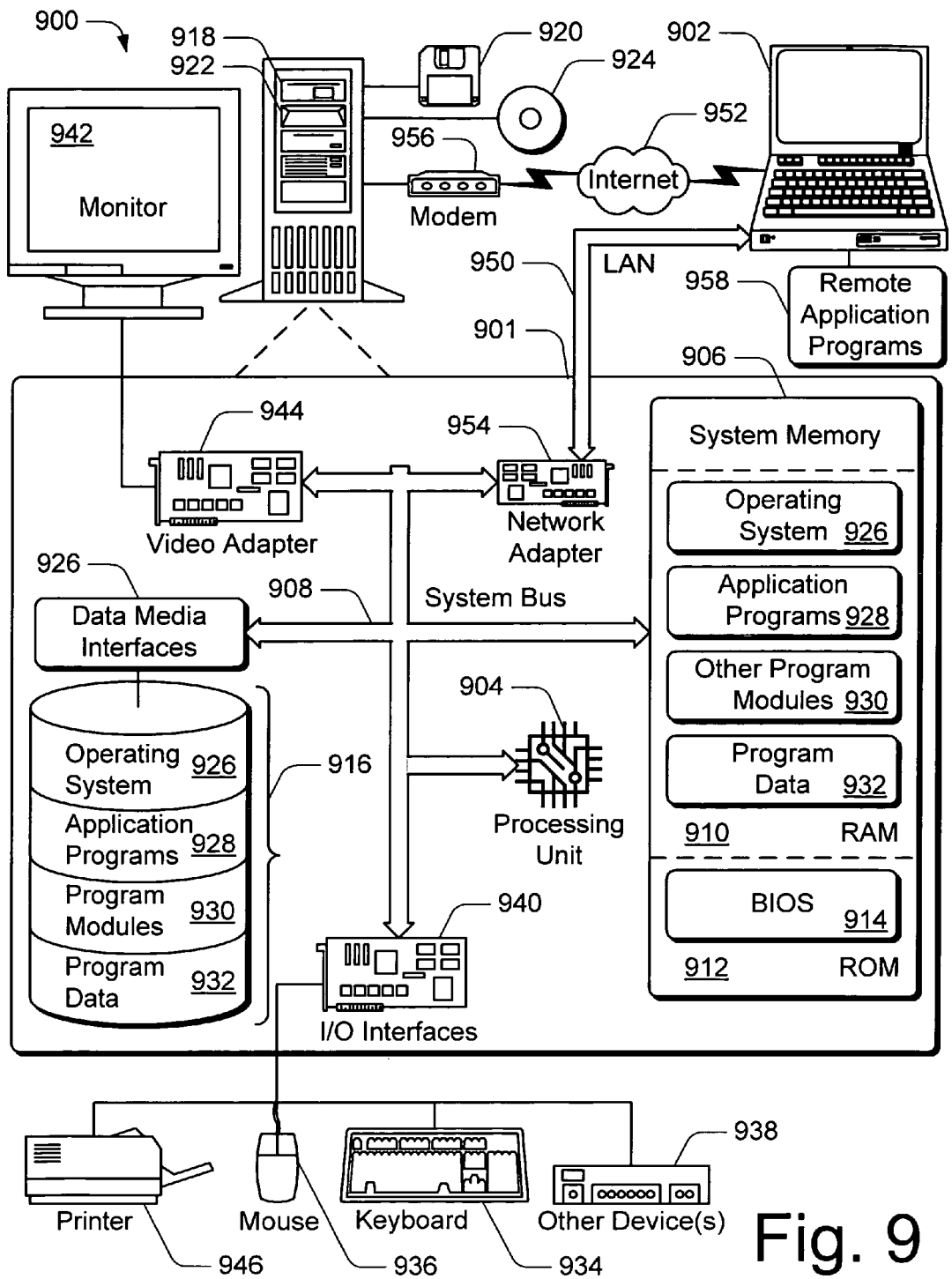
FIG. 9 illustrates exemplary systems, devices, and components in an environment for directing a document's signature workflow between a publisher and a consumer.

FIG. 9 represents an exemplary system or computing environment 900 upon which digital signature workflow may be implemented. System 900 includes a general-purpose computing system in the form of a first machine 901 and a second machine 902.

The components of first machine 901 can include, but are not limited to, one or more processors 904 (e.g., any of microprocessors, controllers, and the like), a system memory 906, and a system bus 908 that couples the various system components. The one or more processors 904 process various computer executable instructions to control the operation of first machine 901 and to communicate with other electronic and computing devices. The system bus 908 represents any number of several types of bus structures, including a memory bus or memory controller, a peripheral bus, an accelerated graphics port, and a processor or local bus using any of a variety of bus architectures.

System 900 includes a variety of computer readable media which can be any media that is accessible by first machine 901 and includes both volatile and non-volatile media, removable and non-removable media. The system memory 906 includes computer-readable media in the form of volatile memory, such as random access memory (RAM) 910, and/or non-volatile memory, such as read only memory (ROM) 912. A basic input/output system (BIOS) 914 maintains the basic routines that facilitate information transfer between components within first machine 901, such as during start-up, and is stored in ROM 912. RAM 910 typically contains data and/or program modules that are immediately accessible to and/or presently operated on by one or more of the processors 904.

First machine 901 may include other removable/non-removable, volatile/non-volatile computer storage media. By way of example, a hard disk drive 916 reads from and writes to a non-removable, non-volatile magnetic media (not shown), a magnetic disk drive 918 reads from and writes to a removable, non-volatile magnetic disk 920 (e.g., a "floppy disk"), and an optical disk drive 922 reads from and/or writes to a removable, non-volatile optical disk 924 such as a CD-ROM, digital versatile disk (DVD), or any other type of optical media. In this example, the hard disk drive 916, magnetic disk drive 918, and optical disk drive 922 are each connected to the system bus 908 by one or more data media interfaces 926. The disk drives and associated computer readable media provide non-volatile storage of computer readable instructions, data structures, program modules, and other data for first machine 901.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, application programs 928, other program modules 930, and program data 932 (or some combination thereof) may include an embodiment of the systems and methods described herein.

A user can interface with first machine 901 via any number of different input devices such as a keyboard 934 and pointing device 936 (e.g., a "mouse"). Other input devices 938 (not shown specifically) may include a microphone, joystick, game pad, controller, satellite dish, serial port, scanner, and/or the like. These and other input devices are connected to the processors 904 via input/output interfaces 940 that are coupled to the system bus 908, but may be connected by other interface and bus structures, such as a parallel port, game port, and/or a universal serial bus (USB).

A monitor 942 or other type of display device can be connected to the system bus 908 via an interface, such as a video adapter 944. In addition to the monitor 942, other output peripheral devices can include components such as speakers (not shown) and a printer 946 which can be connected to first machine 901 via the input/output interfaces 940.

First machine 901 can operate in a networked environment using logical connections to one or more remote computers, such as second machine 902. By way of example, the second machine 902 can be a personal computer, portable computer, a server, a router, a network computer, a peer device or other common network node, and the like. The second machine 902 is illustrated as a portable computer that can include many or all of the elements and features described herein relative to first machine 901.

Logical connections between first machine 901 and the second machine 902 are depicted as a local area network (LAN) 950 and a general wide area network (WAN) 952. Such networking environments are commonplace in offices, enterprise-wide computer networks, intranets, and the Internet. When implemented in a LAN networking environment, the first machine 901 is connected to a local network 950 via a network interface or adapter 954. When implemented in a WAN networking environment, the first machine 901 typically includes a modem 956 or other means for establishing communications over the wide area network 952. The modem 956, which can be internal or external to first machine 901 can be connected to the system bus 908 via the input/output interfaces 940 or other appropriate mechanisms. The illustrated network connections are exemplary and other means of establishing communication link(s) between the first and second machines 901, 902 can be utilized.

In a networked environment, such as that illustrated with System 900, program modules depicted relative to the first machine 901 or portions thereof, may be stored in a remote memory storage device. By way of example, remote application programs 958 are maintained with a memory device of second machine 902. For purposes of illustration, application programs and other executable program components, such as the operating system 926, are illustrated herein as discrete blocks, although it is recognized that such programs and components reside at various times in different storage components of the first machine 901 and are executed by the processors 904 of the first machine.

Exemplary Processes

FIG. 10 illustrates an exemplary process 1000 related to directed digital signature workflow of a document. The order in which the process is described is not intended to be construed as a limitation, and any number of the described process blocks can be combined in any order to implement the process. Furthermore, the process can be implemented in any suitable hardware, software, firmware, or combination thereof. Process blocks 1002 and 1004 occur on a publisher side, while process blocks 1006-1008 occur on a consumer side.

At block 1002 the process enables a publishing user to populate a body portion of a document with content. The content can be any combination of text and/or graphics. The body portion of the document is that portion of the document which a user customarily expects to see, such as when opening a word processing document.

At block 1004 the process allows the publishing user to populate an associated digital signature definitions portion of the document with at least one requested consuming user's name and at least one condition associated with a digital signature of the requested consuming user. The process allows the publishing user to predefine an intended workflow of the document in relation to desired digital signatures. The process allows the publishing user to predefine who is requested to digitally sign the document and one or more conditions associated with the requested digital signature(s). Examples of the conditions are described in detail above and can relate to how the digital signature definitions portion is presented to the consuming user relative to the body of the document, a requested date for the consuming user's signature, and a location of the consuming user, among others. As such, the publishing user is directing who the intended consuming user(s) is and conditions associated with their signature. In at least some scenarios process blocks 1002-1004 facilitate creation of an evidentiary record of the content and conditions of a document which a subsequent consuming user digitally signed. The process switches to the consumer side for process blocks 1006-1008.

At block 1006 the process displays content in a body of a document. The content can be displayed in a customary manner. For instance, a word processing document could be displayed in a traditional manner.

At block 1008 the process generates a digital signature definitions portion of the document relative to the body. The digital signature definitions portion can contain an interface to allow the consuming user to digitally sign the document. In some instances, the digital signature definitions portion can be positioned relative to the body of the document as defined by the publishing user. For instance, a particular digital signature definitions portion may relate to content on a specific page and as such be displayed on that page. In some scenarios multiple digital signature definitions portions are generated relative to specific portions of the body. In at least some implementations, the digital signature definitions portion allows the consuming user to see some or all of the content of the body of the document and the conditions or definitions defined by the publisher when the consuming user contemplates digitally signing the document via the interface provided within the digital signature definitions portion. If the consuming user does not agree to the conditions defined by the publishing user they can refuse to sign the document. However, in an instance where the consuming user does digitally sign the document through the digital signature definitions portion the process can create clear and reproducible representation of what, in fact, the consuming user signed. Such a process reduces misunderstandings about the nature of the document which was signed and/or facilitates workflow of the document as intended by the publishing user.

Although implementations relating to directed signature workflow have been described in language specific to structural features and/or methods, it is to be understood that the subject of the appended claims is not necessarily limited to the specific features or methods described. Rather, the specific features and methods provide examples of implementations for the concepts described above and below.

The invention claimed is:

1. A method, comprising:
enabling, by a computing device implementing a digital signature workflow, a publishing user to populate a body portion of a document with content;
allowing, by the computing device, the publishing user to populate an associated digital signature definitions portion of the document with at least a requested consuming user's name and at least one condition associated with a digital signature of the requested consuming user, the at least one condition associated with the digital signature of the requested consuming user indicating conditional content related to the digital signature of the requested consuming user, the conditional content being included in the digital signature definitions portion of the document;
blocking at least a certain portion of the body portion when the digital signature definitions portion of the document is presented to the requested consuming user; and
receiving, by the computing device, a digital signature of the publishing user, the digital signature of the publishing user being associated with the digital signature definitions portion of the document.

2. The method as recited in claim 1, wherein the allowing comprises allowing the publishing user to designate where the digital signature definitions portion is presented to the consuming user relative to the body portion of the document.

3. The method as recited in claim 1, wherein the allowing comprises storing the requested consuming user's name and the at least one condition in a digital signature definitions component associated with the body portion as metadata.

4. The method as recited in claim 3, wherein the digital signature definitions component provides an identifiable location for document data relating to digital signatures.

5. The method as recited in claim 1, wherein said allowing comprises providing a drop-down list of conditions from which the publishing user can select the at least one condition.

6. The method as recited in claim 1, wherein the digital signature of the publishing user is received after said enabling and said allowing, and the publishing user digitally signs the document such that if the body portion is altered the digital signature of the publishing user is invalidated.

7. The method as recited in claim 1, wherein the digital signature of the publishing user is received after said enabling and said allowing, and the publishing user digitally signs the document such that if the at least one condition of the digital signature definitions portion is altered the digital signature of the publishing user is invalidated.

8. The method as recited in claim 1, wherein the digital signature of the publishing user is received after said enabling and said allowing, and the publishing user digitally signs the document such that if the at least one condition of the digital signature definitions portion is altered or if the body portion is altered then the digital signature of the publishing user is invalidated.

9. The method as recited in claim 1, wherein the at least one condition includes a predefined intent indicating that the requested consuming user agrees to terms and conditions associated with the document by digitally signing the document.

10. A system, comprising:
one or more processors;
one or more computer-readable storage media; and
a digital signature definitions component maintained on the computer-readable media and executed on the one or more processors to enable a publishing user to:
define at least one consuming user to digitally sign a document,
populate the document with a respective name of the at least one consuming user,
define at least one condition associated with a digital signature of the at least one consuming user,
populate the document with the at least one condition associated with the digital signature of the at least one consuming user, and
void a digital signature of the publishing user upon a determination that the respective name of the at least one consuming user or the at least one condition are altered.

11. The system as recited in claim 10, wherein the component further enable the publishing user to digitally sign in reference to the respective name of the at least one consuming user and the at least one condition.

12. The system as recited in claim 10, wherein the at least one condition includes a predefined intent indicating that the at least one consuming user agrees to terms and conditions associated with the document by digitally signing the document.

13. A memory device comprising computer-executable instructions that, when executed by a processor, perform acts comprising:
- populating a body portion of an electronic document with content, the electronic document comprising the body portion and a digital signature definitions portion;
- defining a plurality of consuming users to digitally sign the electronic document;
- defining one or more conditions including a predefined intent indicating that at least one consuming user of the plurality of consuming users agrees to terms and conditions associated with the electronic document by digitally signing the electronic document;
- associating the one or more conditions with the respective digital signature of the each of the plurality of consuming users and the content that the body portion of an electronic document is populated with, wherein the one or more conditions associated with at least one of the respective digital signatures is different from the one or more conditions associated with an additional one of the respective digital signatures;
- populating the digital signature definitions portion of the electronic document with a respective identifier of each of the plurality of consuming users, and with the one or more conditions associated with each respective digital signature of the plurality of consuming users and the content that the body portion of an electronic document is populated with; and
- transferring the electronic document to a respective computing device of each of the plurality of consuming users.

14. The memory device of claim 13, wherein the electronic document includes a signature of a publishing user populating the body portion of the electronic document with content.

15. The memory device of claim 13, wherein the one or more conditions associated with each respective digital signature of the plurality of consuming users are predefined.

16. The memory device of claim 13, wherein the one or more conditions comprise a deadline by which each of the plurality of consuming users is requested to sign.

17. The memory device of claim 13, wherein a first page of the electronic document is associated with a first digital signature definitions portion and a second page of the electronic document is associated with a second digital signature definitions portion.

18. The memory device of claim 17, wherein at least one consuming user included in the first digital signature definitions portion is different from at least one consuming user included in the second digital signature definitions portion.

19. The memory device of claim 17, wherein a particular consuming user is associated with the first digital signature definitions portion and is associated with the second digital signature definitions portion, and wherein the one or more conditions associated with the respective digital signature of the particular consuming user with respect to the first digital signature definitions portion are different from the one or more conditions associated with the respective digital signature of the particular consuming user with respect to the second digital signature definitions portion.

20. The memory device of claim 13, wherein the electronic document comprises a XML Paper Specification (XPS) document format.

* * * * *